United States Patent
Crotty et al.

(10) Patent No.: US 12,004,501 B2
(45) Date of Patent: Jun. 11, 2024

(54) PREDATOR REACTIVE MULTI-LAYER REPELLANT DEVICE

(71) Applicant: MAX A DIFFERENT BREED L.L.C., North Hampton, NH (US)

(72) Inventors: James Grimes Crotty, North Hampton, NH (US); Carrie Sue Lyons, Dana Point, CA (US)

(73) Assignee: MAX A DIFFERENT BREED L.L.C., North Hampton, NH (US)

( * ) Notice: Subject to any disclaimer, the term of this patent is extended or adjusted under 35 U.S.C. 154(b) by 0 days.

(21) Appl. No.: 17/540,419

(22) Filed: Dec. 2, 2021

(65) Prior Publication Data
US 2023/0172187 A1 Jun. 8, 2023

(51) Int. Cl.
*A01M 29/12* (2011.01)
*A01N 25/28* (2006.01)
*A41D 13/00* (2006.01)
*A41D 31/24* (2019.01)

(52) U.S. Cl.
CPC ............ *A01M 29/12* (2013.01); *A01N 25/28* (2013.01); *A41D 13/0002* (2013.01); *A41D 31/245* (2019.02)

(58) Field of Classification Search
CPC . A01M 29/12; A41D 31/245; A41D 13/0002; A01N 25/28
See application file for complete search history.

(56) References Cited

U.S. PATENT DOCUMENTS

| | | | | |
|---|---|---|---|---|
| 4,602,384 A | * | 7/1986 | Schneider | A41D 13/0156 441/103 |
| 5,891,919 A | * | 4/1999 | Blum | C09D 5/1625 504/345 |
| 10,602,791 B2 | * | 3/2020 | Jur | A41D 13/02 |
| 2013/0183364 A1 | * | 7/2013 | Botner | A01N 25/28 424/408 |
| 2015/0147371 A1 | * | 5/2015 | Kovarik | A45D 29/17 132/73 |
| 2022/0160064 A1 | * | 5/2022 | Burford | B32B 5/26 |

* cited by examiner

*Primary Examiner* — Khoa D Huynh
*Assistant Examiner* — Erick I Lopez
(74) *Attorney, Agent, or Firm* — PRETI FLAHERTY BELIVEAU & PACHIOS, LLP

(57) ABSTRACT

A multilayer protective device such as, but not limited to, a garment such as a vest or arm or leg wrap, a bag, a backpack, wraps for tents, camping items, etc. designed to be worn by domesticated or farm animals of various sizes and/or humans or placed on objects for which predator attack is to be deterred. The multilayer protective device is made from a multi-layered composite textile containing a non-toxic, non-lethal repellent substance such that upon a bite from an attacking animal, the non-toxic, non-lethal repellent substance is released deterring the attacking animal for such a time as to allow the wearer or user of the protective device to escape or be rescued.

12 Claims, 4 Drawing Sheets

PREDATOR REACTIVE MULTI-LAYER REPELLANT DEVICE

TECHNICAL FIELD

The present invention relates to a device designed to be worn or used by humans, domesticated/non-domesticated animals and/or objects like bags and backpacks and more particularly, to a multilayered composite textile product containing a non-lethal repellent substance that is released only when bitten by an attacking animal, thereby deterring the attacking animal for a period of time sufficient to allow the wearer or user of the repellent device to escape and/or be rescued.

BACKGROUND INFORMATION

Predatory animals, such as coyotes, for example, have adapted well to urban life living in parks and surrounding areas within boundaries of cities and towns. Coyotes have become less afraid of humans both in urban areas as well as those areas in or bordering more rural areas. Along with humans living in the urban areas or visiting more remote areas comes their domesticated animals such as dogs and cats. Both humans as well as their domesticated animals are often subject to attack by wild animals such as, but not limited to, coyotes, fox, rabid animals, bobcats, wolves or even bears.

Various prior art repellent or deterrent devices have been suggested for use by domesticated and even non-domesticated animals to repel or deter attacks by wild animals. However, these devices are either complicated, expensive, or not practical for everyday use.

As such there exists an unmet need for a device designed to be worn as a garment (such as a vest or covering or backpack or object wrap) and used by a human, domesticated or even perhaps farm animal that can deter predators such as coyotes, bobcats, mountain lions, fox, wild cats, rabid animals and even bears from attacking dogs, cats, sheep in fields and other domesticated and/or farm animals as well as humans.

SUMMARY OF THE INVENTION

The invention features a multi-layered, reactive repellent released only when device/garment bitten by predator) protective device/garment containing a non-toxic, non-lethal repellent substance that is released when a predator exerts a predetermined amount of pressure (for example greater than 50 PSI) onto the device/garment. The repellent substance is carried and delivered by a core carrier substrate layer. The core carrier substrate layer may comprise an open cell foam layer or a non-woven fabric layer. The core carrier substrate has a first planer surface, a second planer surface, and first and second ends.

In a first embodiment, the repellent substance is enclosed in a plurality of microcapsules, wherein each of the plurality of microcapsules are configured for containing the non-toxic, non-lethal repellent substance. Alternatively, the non-toxic, non-lethal repellent substance may not be encapsulated. The repellent substance (encapsulated or non-encapsulated) may be applied directly onto one or both planar surfaces of the core carrier substrate (adsorption) or alternatively the non-toxic, non-lethal repellent substance may be provided and applied to be absorbed or drawn into the core carrier substrate through one or both planar surface (and/or ends) of the core carrier substrate.

A core carrier substrate covering layer is disposed adjacent the first and second planer surfaces and the first and second ends of the core carrier substrate after receiving the non-toxic, non-lethal repellent substance. A top protective layer is disposed over the core carrier substrate covering layer and adjacent one of the first and second carrier substrate planer surfaces.

A bottom protective layer is disposed over the core carrier substrate covering layer and adjacent the other of the first and second carrier substrate planer surface. The top protective layer and the bottom protective layer are joined together proximate the first and second ends of the core carrier substrate and configured for providing a protective enclosure for the core carrier substrate and the core carrier substrate covering layer after receiving the non-toxic, non-lethal repellent substance.

In a first embodiment, the non-toxic, non-lethal repellent substance includes *Capsicum* oleoresin and the carrier substrate includes foam. The top protective layer is configured to cover a first outermost side of the protective device/garment and designed to be disposed away from a wearer of the protective device/garment and designed to be puncture resistant to a level of greater than 50 PSI and more preferably between 50 to 100 psi, while the bottom protective layer is configured to cover a second outermost side of the protective device/garment and designed to be located proximate the animal or human being protected by the protective device/garment, and designed to be puncture resistant to a level of between 200 and 400 psi. The bottom protective layer is preferably configured to be weather resistant and puncture resistant and wherein a total puncture resistance of the protective device garment is greater than 200 psi, and preferably between 200 and 400 psi.

The protective device/garment is typically selected from the group of protective devices/garments consisting of a vest, a collar, an arm guard, a leg guard, a mid-section guard and a neck guard.

Another embodiment features a protective device/garment containing a non-toxic, non-lethal repellent substance comprising a plurality of microcapsules, each of the plurality of microcapsules configured for containing a non-toxic, non-lethal repellent substance. A core carrier substrate is provided unto which has been applied the plurality of microcapsules. The core carrier substrate includes a first planer surface, a second planer surface, and first and second ends.

A core carrier substrate covering layer is disposed adjacent the first and second planer surfaces and the first and second ends of the core carrier substrate after receiving the non-toxic, non-lethal repellent substance. A top protective layer is disposed over the core carrier substrate covering layer and adjacent one of the first and second carrier substrate planer surfaces.

A bottom protective layer is disposed over the core carrier substrate covering layer and adjacent the other of the first and second carrier substrate planer surface. The top protective layer and the bottom protective layer are joined together proximate the first and second ends of the core carrier substrate and configured for providing a protective enclosure for the core carrier substrate and the core carrier substrate covering layer onto which is been applied the plurality of microcapsules.

The bottom protective layer is configured to cover a second outermost side of the protective garment and designed to be proximate the animal or human being protected by the protective garment and designed to be puncture resistant to a level of between 150 and 400 psi. The total puncture resistance of the protective garment is greater than 200 psi, and preferably between 200 and 400 psi.

In one embodiment, the protective device is a garment designed to be worn by or used by a human, animal, or object for protection, such as but not limited to a vest, a collar, an arm guard, a leg guard, a mid-section guard, a neck guard. However, in another embodiment, the protective device may include but not be limited to a bag, a backpack, and a protective wrap for an animal, human or object/items.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
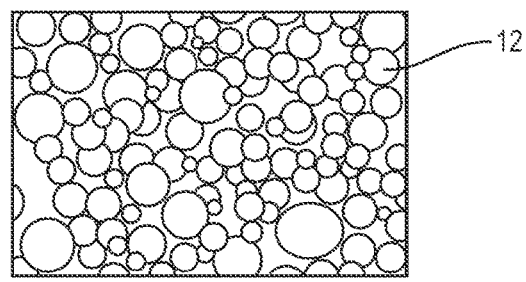
FIG. 1 is an enlarged view of microcapsules according to one embodiment of the present invention.
Figure 2:
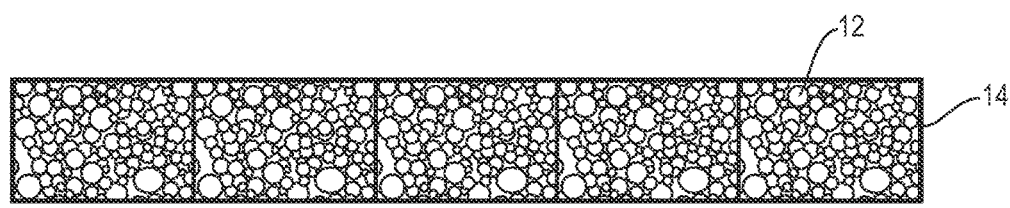
FIG. 2 is a cross-sectional view of the microcapsules containing a deterrent loaded into a carrier substrate, such as foam, according to one feature of the present invention.
Figure 3:
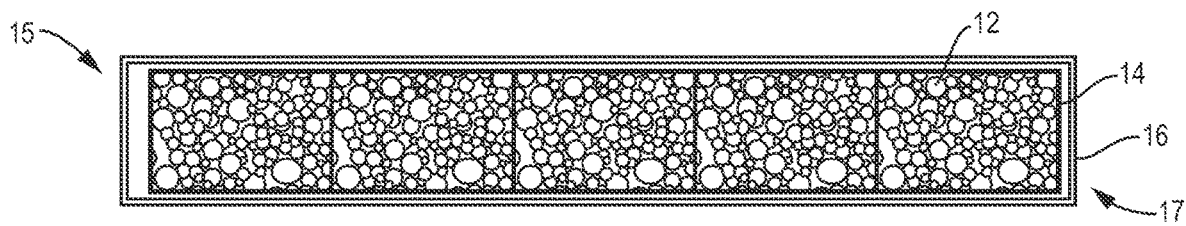
FIG. 3 is a cross-sectional view of the microcapsules containing a deterrent loaded into a carrier substrate enclosed in a first protective containment layer or material, according to another feature of the present invention.
Figure 4:
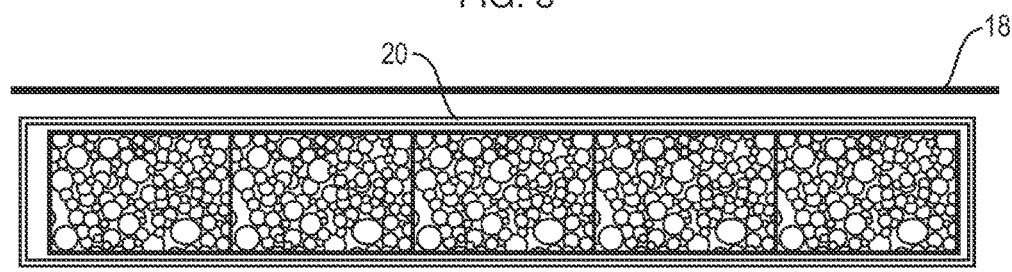
FIG. 4 is a cross-sectional view of the microcapsules containing a deterrent loaded into a carrier substrate enclosed in a first protective containment layer or material with a top or outer layer applied, according to another feature of the present invention.
Figure 5:
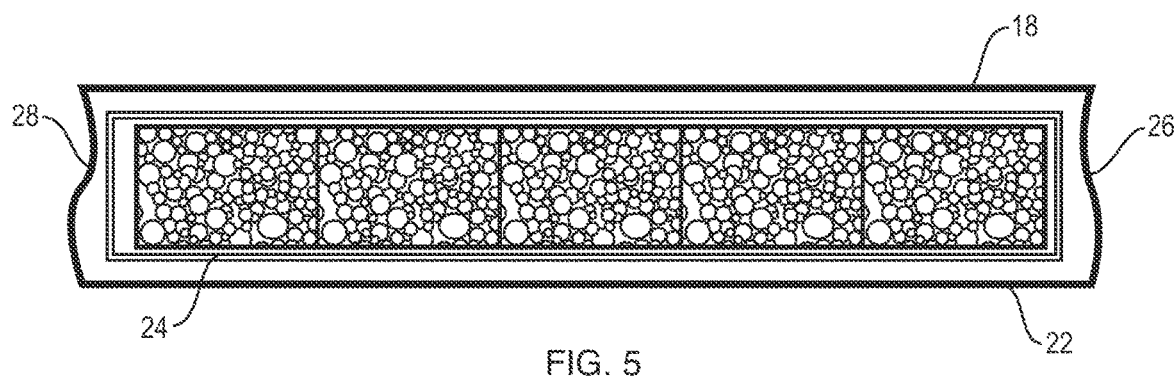
FIG. 5 is a cross-sectional view of the microcapsules containing a deterrent loaded into a carrier substrate enclosed in a first protective containment layer or material with top and bottom outer layers applied, according to another feature of the present invention.
Figure 6:
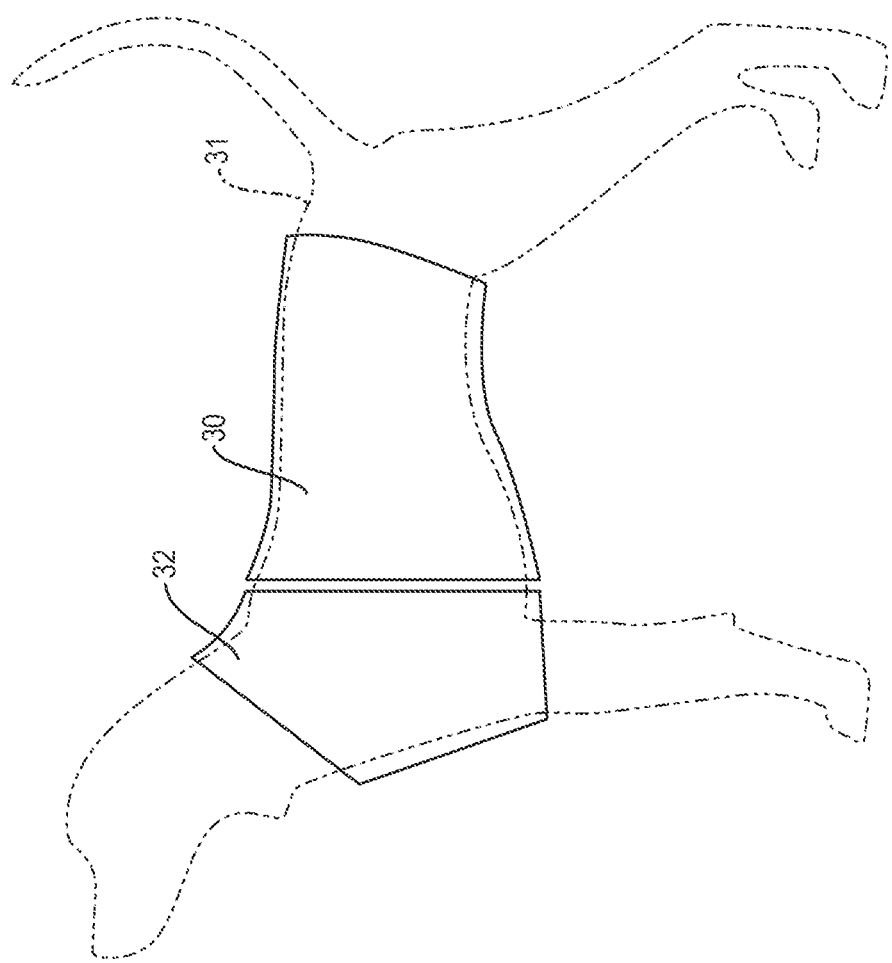
FIG. 6 is a silhouette view of a domesticated animal (dog) illustrating the use and possible placement(s) of a Predator Reactive Multi-Layer Repellent Device according to the present invention.
Figure 7:
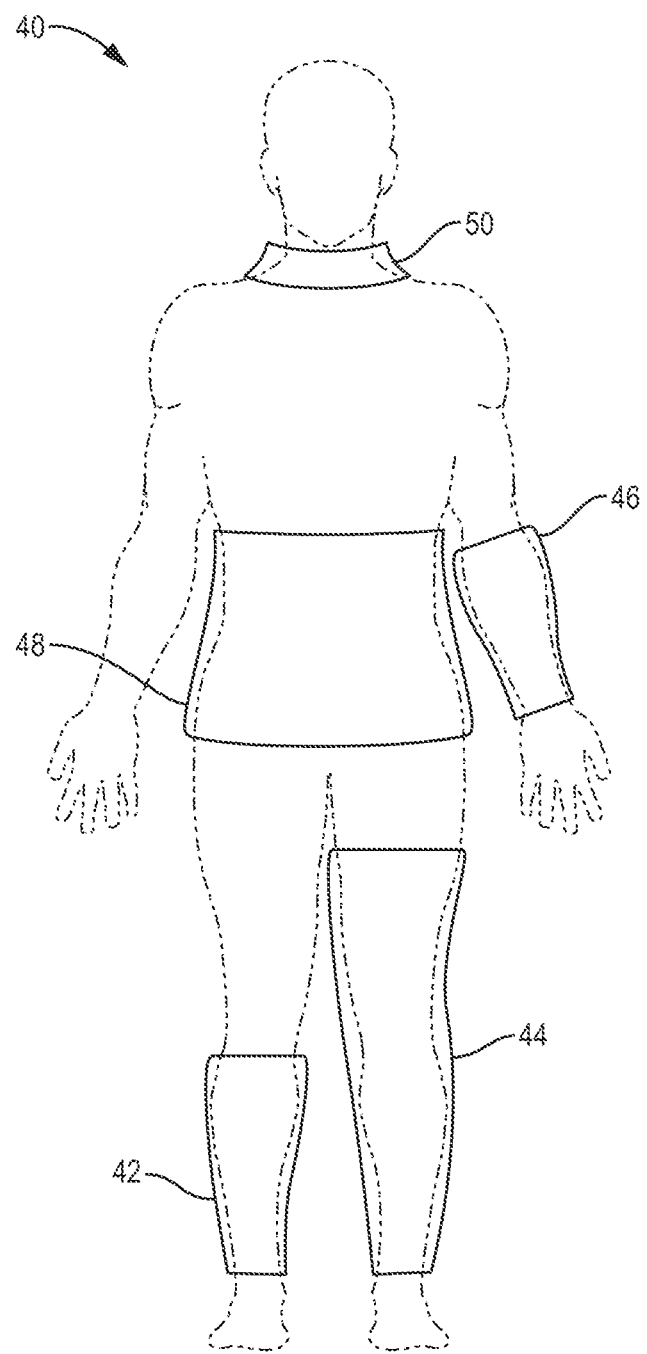
FIG. 7 is a silhouette view of a person illustrating the use and possible placement(s) of a Predator Reactive Multi-Layer Repellent Device according to the present invention.
Figure 8:
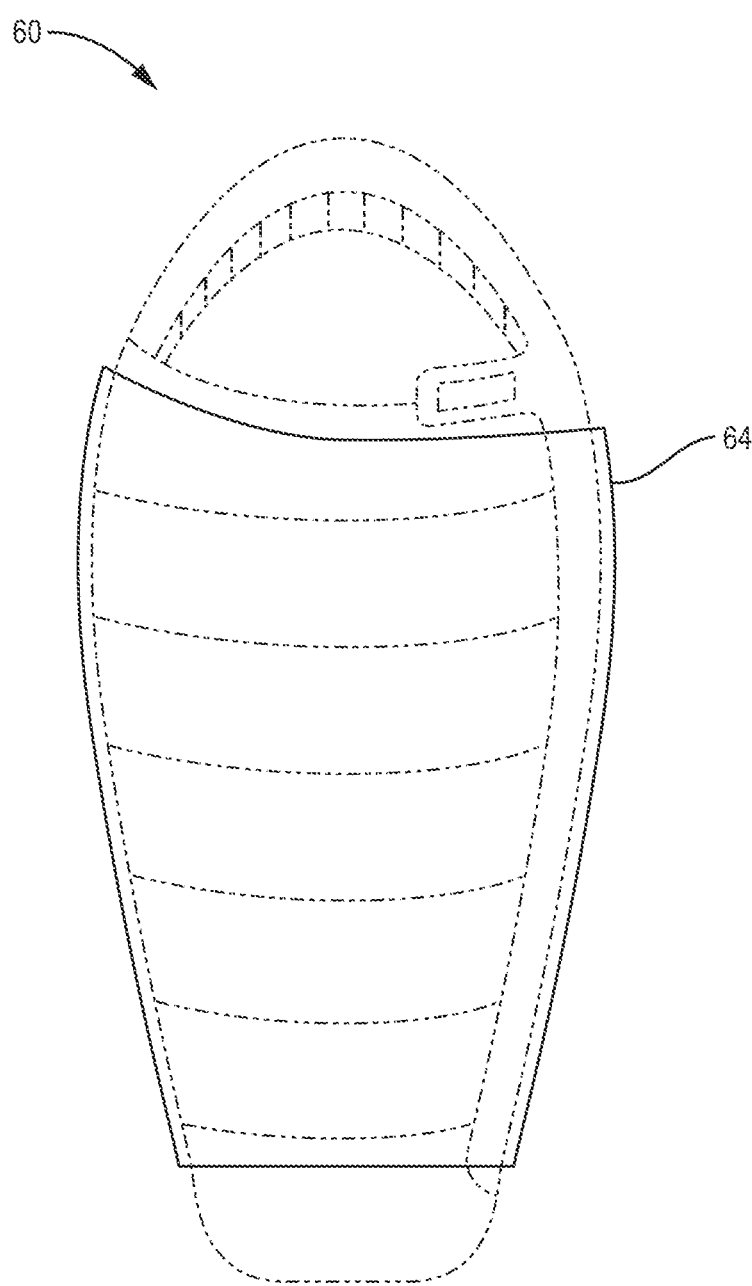
FIG. 8 is a silhouette view of a sleeping bag illustrating the use and possible placement(s) of a Predator Reactive Multi-Layer Repellent Device according to the present invention.

The present invention features a reactive (not used or released until bitten by a predator) non-lethal chemical deterrent, which, in a first embodiment, includes microencapsulated *Capsicum* oleoresin 12, FIG. 1, which is embedded within or disposed on the surface of a porous or non-porous core carrier material structure 14, FIG. 2, such as foam, non-woven fabrics and diaper material made up of cellulose, polypropylene, polyethylene and a super absorbent polymer, and extruded plastics which can then be used as a carrier for the deterrent chemical/particles. The non-lethal chemical deterrent may be applied so as to be absorbed into the core carrier structure 14 or alternatively, designed to be adsorbed onto one or both planer surfaces of the core carrier substrate 14.

This first embodiment can be achieved by first microencapsulating *Capsicum* oleoresin in a protective "shell" that breaks apart upon the application of sufficient force. The protective "shell" is typically of a size of between 50 nm and 2 mm. The microencapsulated *Capsicum* oleoresin shells are then suspended in an appropriate carrier fluid, such as water.

The carrier fluid, with particles microencapsulating the *Capsicum* oleoresin suspended within, can then be applied by for example dipping the core carrier substrate 14 onto which the microencapsulated *Capsicum* is to be deposited into a bath then letting it dry, or utilizing a padding method in which the fabric or core carrier substrate 14 passes into a solution of chemicals, under a submerged roller and out of the bath. The core carrier substrate 14 is then squeezed to remove excess solution. Alternatively, a solution including the microencapsulated *Capsicum* may be sprayed onto the fabric serving as the core carrier substrate 14, or plasma deposited onto a porous material structure forming the core carrier substrate 14 such as foam, to adequately load the core carrier substrate 14 with the desired level of particles with microencapsulated *Capsicum* oleoresin.

Drying of the core carrier substrate 14 and fluid containing the particles will then drive off the carrier fluid and leave behind the particles, embedded on or within the core carrier substrate 14. Examples of core carrier substrate materials include open cell foams, and nonwoven textiles, and the like.

The carrier fluid can also be applied to the core carrier substrate 14 by padding wherein the core carrier substrate 14 passes into a solution of chemicals, under a submerged roller and out of the bath. It is then squeezed to remove excess solution, or by spaying, dipping, plasma deposition, and printing.

Micro-encapsulation is a process in which tiny particles (microparticles) are surrounded by a shell. In general, it is used to incorporate food ingredients, enzymes, cells or other materials on a micrometric scale. Micro-encapsulation can also be used to enclose solids, liquids, or gases inside a micrometric wall made of hard or soft soluble film, in order to reduce dosing frequency and prevent the degradation of pharmaceuticals and other substances.

The shells burst upon contact and some predetermined amount of pressure or can be customized to a desired delivery system or exposure conditions. The protective shell that surrounds the *Capsicum* breaks when physical contact and sufficient pressure is applied such as in the case of a coyote bite.

The micro-encapsulated material in the shells will burst upon physical contact by the attacking predator in area of the attack. This delivery mechanism has the advantage of limiting exposure to the protected animal and its owner; is easy to manufacture; has an extended life including the composite textile loaded with capsaicin; and can deliver a substance with a Scoville heat unit (SHU) of between 250,000 and 1,500,000 SHU.

Activation of the repellent occurs instantly when it is transferred to the predator upon bite penetration into the core at a PSI greater than approximately 50 PSI. When activated, the repellent is not released into the air and any significant amount or onto the skin of the animal or human being protected. Therefore, there is no impact to the protected animal or owner. In addition, the multilayer structure of the device/garment of the present invention withstands normal activities without activation.

The preferred nontoxic repellent substance to be microencapsulated or otherwise stored on the device/garment is *Capsicum* oleoresin such although other substances are contemplated and discussed herein. *Capsicum* oleoresin contains the active ingredient capsaicin which is the very strong-tasting spicy component of a chili pepper. Capsaicin is a neuropeptide releasing agent selective for primary sensory peripheral neurons. It tricks the brain into thinking mouth is on fire with no real heat. Coyotes and most canids are repelled by the capsaicin.

*Capsicum* Oleoresin or other similar natural and synthetic analogs serve as a non-toxic repellent to mammals and humans by activating sensory axons neurons in the body tricking the brain into thinking the mouth is on "fire". Capsaicin is one such substance and is used commercially to repel rodents by causing distress to the mucus secreting membranes making the mouth nose and eyes burn with no harmful long term side effects.

*Capsicum* oleoresin contains the active ingredient capsaicin responsible for giving chili peppers their pungency (spicy heat). Capsaicin is a neuropeptide releasing agent selective for primary sensory peripheral neurons. Capsaicin binds to pain receptors on our nerves called TRPV1 which senses body temperature. Normally, it reacts to heat by sending warning signals to the brain. Capsaicin causes TRPV1 to send those same signals. Animals and humans therefore react as if there is something very hot in their mouth.

Examples of other like natural and synthetic analogs substances include Resiniferatoxin (RTX) which is a naturally occurring chemical found in resin spurge (*Euphorbia resinifera*), a cactus-like plant commonly found in Morocco, and in *Euphorbia poissonii* found in northern Nigeria. It is a potent functional analog of capsaicin, the active ingredient in chili peppers. Just like Capsaicin it binds to pain receptors nerves called TRPV1 and sends a signal to the brain that there something very hot in the mouth.

Another Capsaicin analog is Synthetic Pseudocapsaicin, Formal Name N-[(4-hydroxy-3-methoxyphenyl)methyl] nonanamide. It acts just like Capsaicin in that it binds to pain receptor nerves TRPV1 and sends a signal to the brain that there something very hot in the mouth.

In 1912 an American pharmacist Wilbur Scoville created his own pungency scale now referred to as the Scoville Heat U it (SHU). Since the 1980s, spice heat has been assessed quantitatively by high-performance liquid chromatography (HPLC), which measures the concentration of heat-producing capsaicinoids, typically with capsaicin content as the main measure. HPLC results permit the measurement of substance's capsaicin capacity to produce perceived heat ("pungency"). The Scoville Heat Unit (SHU) Scale from bell peppers with 0 SHU to pure Resiniferatoxin with 16,000,000 SHU.

In its simplest form, a microcapsule, as disclosed and discussed in connection with a first embodiment of the invention, is a small sphere comprising a near-uniform wall enclosing some material. A microcapsule is defined as a spherical particle with a size varying between 50 nm and 2 mm and containing a core substance. The material enclosed in the microcapsule is referred to as the core, internal phase, or fill, whereas the wall is sometimes called a shell, coating, or membrane. Some materials like lipids and polymers, such as alginate, may be used as a mixture to trap the material of interest inside.

The porous material structure with embedded deterrent chemistry (the core carrier substrate) 14 is preferably surrounded by a first protective layer or membrane 16, FIG. 3, such as a plastic wrap, a PTFE membrane or even a PU coating, which is bonded or otherwise applied to and covers the edges 15,17 of the core carrier substrate 14 to form an enclosure around the core carrier substrate 14 with embedded nontoxic repellent substance material within, and configured to keep the nontoxic repellent substance within the core carrier substrate 14 until an attacking animal breaks through the other protective layers as described below.

A top fabric layer 18, FIG. 4, is arranged adjacent to one plane 20 of the first protective layer or membrane 16 to cover the outermost side of the protective device/garment facing away from the wearer and designed to be puncture resistant to a level of between 50 to 100 psi. This level is chosen to be durable enough to not inadvertently release the deterrent during normal play and/or walking activities, but low enough so that an attacking animal will puncture the layer, releasing the deterrent substance into the attacking animal's mouth.

A bottom fabric layer 22, FIG. 5, is arranged adjacent to the second primary plane 24 of the first protective layer or membrane 16, and configured to be arranged proximal to the animal or human being protected by the garment, designed to be weather resistant and puncture resistant to a level such that the total puncture resistance of the 5-layer composite structure is greater than 200 psi, preferably between 200 and 400 psi, such that an attacking animal will not readily bite through the entire composite, harming the animal or human wearing the device. The puncture resistance of the bottom fabric layer only is preferably approximately at least 150 psi.

The top layer 18 and bottom fabric layer 22 are durably joined (such as by sewing, gluing, heat welding or the like) at the periphery (edges) 26, 28 forming an enclosure that contains the core carrier substrate with repellent chemistry 14 and the first protective layer/membrane 16. The top and bottom layers 18, 22 may then be designed and shaped to conform around an animal's body or body part (neck or stomach area for example) or to a human's body part for which protection is desired (arm, leg, mid-section or even neck for example) protecting vital areas such that an attacking animal would first contact the protective textile composite.

In one embodiment, the protective device is a garment designed to be worn by or used by: an animal 31, FIG. 6, including a mid-section vest 30 and/or a neck and shoulder vest 32; a human 40, FIG. 7 including but not limited to a lower leg (calf) protector 42, an entire leg protector 44, an arm protector 46, a mid-section protector 48 and/or a neck protector 50; and also an object 60, FIG. 8, such as a protective device in the form of a wrap 62 on a sleeping bag. The protective device may also be used on a bag and a backpack.

As stated above, the present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are within the scope of the present invention, which is not to be limited except by the allowed claims and their legal equivalents.

The invention claimed is:

1. A multi-layer protective device containing a non-toxic, non-lethal repellent substance, said multi-layer protective device comprising:

a non-toxic, non-lethal repellent substance;

a core carrier substrate, configured for receiving said non-toxic, non-lethal repellent substance, the core carrier substrate having a first planer surface, a second planer surface, and first and second ends;

a core carrier substrate covering layer, disposed adjacent said first and second planer surfaces and said first and second ends of said core carrier substrate after receiving said non-toxic, non-lethal repellent substance;

a top protective layer, disposed over said core carrier substrate covering layer and adjacent one of said first and second carrier substrate planer surfaces; and a bottom protective layer, disposed over said core carrier substrate covering layer and adjacent the other of said first and second carrier substrate planer surface, and wherein said top protective layer and said bottom protective layer are joined together proximate said first and second ends of said core carrier substrate and configured for providing a protective enclosure for said core carrier substrate and said core carrier substrate covering layer after receiving said non-toxic, non-lethal repellent substance;

wherein said non-toxic, non-lethal repellent substance is encapsulated in a plurality of microcapsules suspended in a carrier fluid, each of said plurality of microcapsules configured for containing an amount of said non-toxic, non-lethal repellent substance; and wherein said carrier fluid is absorbed into said core carrier substrate or adsorbed onto one or more surfaces of said core carrier substrate.

2. The protective device according to claim 1, wherein said non-toxic, non-lethal repellent substance includes *Capsicum* oleoresin.

3. The protective device according to claim 1, wherein said core carrier substrate is selected from the group of core carrier substrates consisting of foam and non-woven fabric.

4. The protective device according to claim 1, wherein said top protective layer is configured to cover a first outermost side of the protective device and configured, in use, to be disposed away from a wearer of the protective device and designed to be puncture resistant to a level of between 50 to 100 psi.

5. The protective device according to claim 4, wherein said bottom protective layer is configured to cover a second outermost side of the protective device and configured, in use, to be disposed proximate an animal or a human being protected by the protective device and configured to be puncture resistant to a level of between 150 to 400 psi.

6. The protective device according to claim 5, wherein said bottom protective layer is configured to be weather resistant and puncture resistant, and wherein a total puncture resistance of said multi-layer protective device is greater than 200 psi, and preferably between 200 and 400 psi.

7. The multi-layer protective device according to claim 6, wherein said multi-layer protective device garment is selected from the group of protective devices consisting of a vest, a collar, an arm guard, a leg guard, a mid-section guard, a neck guard, a bag, a backpack, and a protective wrap for an object.

8. The multi-layer protective device according to claim 1, wherein said multi-layer protective device is selected from the group of protective garments consisting of a vest, a collar, an arm guard, a leg guard, a mid-section guard, a neck guard, a bag, a backpack, and a protective wrap for an object.

9. The multi-layer protective device according to claim 1, wherein said carrier fluid is absorbed into said core carrier substrate.

10. The multi-layer protective device according to claim 1, wherein said carrier fluid is adsorbed onto one or more surfaces of said core carrier substrate.

11. A multi-layer protective garment containing a non-toxic, non-lethal repellent substance, said multi-layer protective garment comprising:

a plurality of microcapsules suspended in a carrier fluid, each of said plurality of microcapsules configured for containing a non-toxic, nonlethal repellent substance;

a core carrier substrate, configured for receiving said plurality of microcapsules, said core carrier substrate having a first planer surface, a second planer surface, and first and second ends;

a core carrier substrate covering layer, disposed adjacent said first and second planer surfaces and first and second ends of said core carrier substrate after receiving said plurality of microcapsules;

a top protective layer, disposed over said core carrier substrate covering layer and adjacent one of said first and second core carrier substrate planer surfaces, wherein said top protective layer is configured to cover a first outermost side of the multi-layer protective garment and configured to be disposed away from a wearer of the protective garment when in use, and designed to be puncture resistant to a level of between 50 to 100 psi;

a bottom protective layer, disposed over said core carrier substrate covering layer and adjacent the other of said first and second core carrier substrate planer surface, and wherein said top protective layer and said bottom protective layer are joined together proximate said first and second ends of said core carrier substrate, and configured for providing a protective enclosure for said core carrier substrate and said core carrier substrate cover layer having received said plurality of microcapsules, wherein said bottom protective layer is configured to cover a second outermost side of the protective garment and designed to be proximate the animal or human being protected by the multi-layer protective garment, and designed to be puncture resistant to a level of between 150 to 400 psi; and wherein a total puncture resistance of said multi-layer protective garment is greater than 200 psi, and preferably between 200 and 400 psi.

12. A multi-layer protective device containing a non-toxic, non-lethal repellent substance, said multi-layer protective device comprising:

a plurality of microcapsules suspended in a carrier fluid, each of said plurality of microcapsules configured for containing a non-toxic, non-lethal repellent substance;

a core carrier substrate, configured for receiving said plurality of microcapsules, said core carrier substrate having a first planer surface, a second planer surface and first and second ends;

a core carrier substrate covering layer, disposed adjacent said first and second planer surfaces and said first and second ends of said core carrier substrate after receiving said plurality of microcapsules containing said non-toxic, non-lethal repellent substance;

a top protective layer, disposed over said core carrier substrate covering layer and adjacent one of said first and second carrier substrate planer surfaces; and a bottom protective layer, disposed over said core carrier substrate covering layer and adjacent the other of said first and second carrier substrate planer surface, and wherein said top protective layer and said bottom protective layer are joined together proximate said first and second ends of said core carrier substrate and configured for providing a protective enclosure for said core carrier substrate and said core carrier substrate covering layer after receiving said plurality of microcapsules containing said non-toxic, nonlethal repellent substance.

\